United States Patent [19]

Trapp et al.

[11] Patent Number: 5,012,919

[45] Date of Patent: May 7, 1991

[54] APPARATUS FOR STORING PIECE GOODS

[75] Inventors: Hans-Juergen Trapp, Salinenweg 31, D-7889 Grenzach-Wyhlen; Reinhard Buerger, Ostfildern, both of Fed. Rep. of Germany

[73] Assignee: Hans-Juergen Trapp, Fed. Rep. of Germany

[21] Appl. No.: 359,021

[22] Filed: May 30, 1989

[30] Foreign Application Priority Data

Jun. 2, 1988 [DE] Fed. Rep. of Germany ....... 3818781

[51] Int. Cl.$^5$ .............................................. B65G 47/84
[52] U.S. Cl. ................... 198/474.1; 198/802; 211/122
[58] Field of Search ............ 198/468.2, 474.1, 476.1, 198/477.1, 802, 792, 803.14, 469.1; 211/121, 122

[56] References Cited

U.S. PATENT DOCUMENTS

| 2,932,376 | 4/1960 | Millington | 198/468.2 |
| 3,199,658 | 8/1965 | Graber et al. | 211/121 |
| 3,780,852 | 12/1973 | Weiss et al. | 211/122 |
| 4,270,652 | 6/1981 | Lay et al. | 198/468.2 |
| 4,574,962 | 3/1986 | Tabler et al. | 211/122 |
| 4,662,509 | 5/1987 | Kaak | 198/792 |

FOREIGN PATENT DOCUMENTS

| 7815098 | 10/1978 | Fed. Rep. of Germany . |
| 3418244 | 11/1984 | Fed. Rep. of Germany . |
| 3346688 | 6/1985 | Fed. Rep. of Germany . |
| 3619921 | 12/1987 | Fed. Rep. of Germany . |

*Primary Examiner*—Joseph E. Valenza
*Attorney, Agent, or Firm*—Eckert Seamans Cherin & Mellott

[57] ABSTRACT

An apparatus for storing piece goods contains chassis with mounting supports, which are movable along a guideway constituted by two semicircles and two linear portions interconnecting these. The movement takes place in both directions. In order to permit a good space utilization and a high access speed, the piece good mounting supports are forcibly guided in such a way that the initiation of the rotary movement for the mounting supports takes place in shock-free manner.

22 Claims, 4 Drawing Sheets

APPARATUS FOR STORING PIECE GOODS

BACKGROUND OF THE INVENTION

1. Field of the Invention

The invention relates to an apparatus for storing piece goods, particularly data carrier cassettes, in which a plurality of mounting supports for receiving the piece good is moved along a closed movement path, which is formed from circular arcs and linear portions interlinking these.

2. Prior Art

An audio tape cassette magazine is already known (German Utility Model No. 78 15 098), in which the mounting supports are fixed to an endless conveyor belt guided by means of two guide rollers. The conveyor belt can be guided around both horizontal and vertical axes and mention is made of a motor drive. The audio tape cassettes are removed in the center of the end face.

SUMMARY OF THE INVENTION

An object of the present invention is to provide an apparatus for storing piece good units, particularly data carrier cassettes, which permits a high access speed with optimum space utilization.

According to the invention this object is achieved in that the mounting supports are rotatably arranged with respect to the path along which they are moved and are forcibly controlled in such a way that the transition between the linear movement and the rotary movement takes place in shock-free manner in the vicinity of the transition from the linear to the curved portion of the movement path in both inlet and outlet.

In the known apparatus the mounting supports, namely the reception pockets, are rigidly connected to the conveyor belt, so that at the transition from the straight to the curved belt portion, the mounting supports must be accelerated in a very short time from the rotational speed zero to a finite rotational speed and vice versa. This intermittent acceleration process stimulates the system, particularly in the case of a small guide radius, with increasing rotational speed in an increasingly violent manner, so that on the one hand noise occurs and the stored material is exposed to harmful vibrations and on the other hand the increasing accelerative forces lead to premature damage and destruction to the conveyor belt and to the coupling elements for the mounting supports.

However, the measures according to the present invention ensure that the rotary movement of the mounting supports takes place in shock-free manner, so that the permitted speed can be increased. This is all the more important because for achieving a particularly good space utilization the spacings between the linear portions of the movement path must be kept as small as possible. In the present case the movement path is the geometrical line along which the mounting supports are moved and said movement path can also be realized by a rail, track or the like.

In order to achieve a particularly favorable shock-free initiation of the rotary movement, according to a further development of the invention, the rotary movement starts before reaching the curved path portion and ends on leaving the latter. Thus, a greater distance exists for the rotational acceleration and therefore a longer time is available, so that there can be an overall reduction in the rotational accelerations.

In order to achieve a correspondingly constructed movement path, according to the invention the mounting supports are fixed to chassis, which can move along the guideway forming the movement path. This guideway can e.g. be a rail.

The mounting supports or chassis can be driven by chains, gears, etc. It is particularly advantageous if the chassis are driven by a driving belt guided along the movement path or guideway. This driving belt can e.g. be a toothed belt, which is guided via two gears and in this way forms an oval. It can act by means of drivers or other devices on the chassis and/or the mounting supports.

According to a further development of the invention, the mounting supports are fixed in rotatable manner to the chassis and each mounting support has a steering lever connected thereto in non-rotary manner and which brings about the rotary position of the mounting support. The steering lever can e.g. be guided on a second guideway, which brings about a forced rotation of the particular mounting support or the associated chassis.

The forced or forcible control can in particular be brought about in that on the end of each pivoted lever acts one end of a push rod fixed in rotary manner to the in each case adjacent chassis. This achieves a forcible control as a result of the constant spacings between the individual chassis and without it being necessary to provide an additional guideway for the steering lever. The steering lever can in particular be directed outwards with respect to the movement path.

The guideway can e.g. be formed by a rail on which the chassis are guided by means of runners.

According to a further development of the invention vertical rods or pipes are fixed in rotary manner to the chassis and the mounting supports are fixed in non-rotary manner to said rods or pipes. The forcible control of the mounting supports then takes place through the corresponding rotary movement of the rods or pipes.

In order to also ensure the exact guidance of the mounting supports when e.g. the rods are very long, according to a further development of the invention the rods or pipes are connected at both ends to chassis, the lower and upper chassis being in each case guided by a guideway.

The apparatus proposed by the invention is not only intended for the storing of cassettes and it is also intended that the latter can be removed by an automatic gripper. For this purpose the cassettes should be exactly positioned with respect to their mounting support. In order to permit a rapid insertion of the cassettes, according to a further development of the invention it is proposed that the mounting supports for the cassettes are constructed in hopper or funnel-shaped manner. This means that an insertion of the cassettes need only be carried out with a relatively imprecise positioning, because the cassette then slides into the funnel shape and positions itself therein. The funnel shape is naturally adapted to the shape of the cassettes. The invention proposes that for parallelepipedic cassettes the mounting support can have three contact or bearing surfaces perpendicular to one another, whereof each surface is inclined to the vertical. No matter on which of the three surfaces the cassette firstly engages on insertion, it will slide downwards until it engages on the three surfaces. Thus, the cassette is accurately positioned for a subsequent removal.

According to a further development, the mounting supports have sleeve portions which can be slid onto the rods or pipes.

In order that during the assembly of the apparatus the mounting supports can be accurately positioned with respect to one another and the apparatus, the sleeve portions can have on their top and/or bottom alignment devices for bringing about an alignment with respect to the adjacent mounting support or with respect to the chassis. Thus, e.g. the chassis can have a locking pin or the like and the bottom of each sleeve portion can be shaped in a complementary manner. Thus, the mounting support can only be fitted to the chassis in the correct position. The top of the sleeve portion is correspondingly constructed in the same way as the chassis, so that the next mounting support can be positioned accurately with respect to the in each case underlying mounting support.

According to the invention, for inserting and removing the cassettes, an automatic gripper can be located in the vicinity of the front end of the movement path. The fact of carrying this out in the vicinity of the front ends of the movement path has the advantage that the reciprocal spacing of the cassettes is horizontally greater there than in the vicinity of the linear portions of the movement path.

According to a further development, several apparatus can be juxtaposed in such a way that their front ends used for removal are roughly located on a circular line. This is particularly advantageous if the automatic gripper is located on a fixed point and rotates about a fixed axis. The spacing with respect to all the apparatus is then the same, which facilitates the control of the gripper.

Several mounting supports can be superimposed and interconnected by bonding, welding, bracing, etc. They can also be moved out with or without a reciprocal connection on a rod or the like. It is also advantageously possible to construct several mounting supports in one piece and use the same with or without a rod.

BRIEF DESCRIPTION OF THE DRAWINGS

The invention is described in greater detail hereinafter relative to a nonlimitative embodiment and the attached drawings, wherein are shown.

DETAILED DESCRIPTION OF THE PREFERRED EMBODIMENTS

Figure 1:
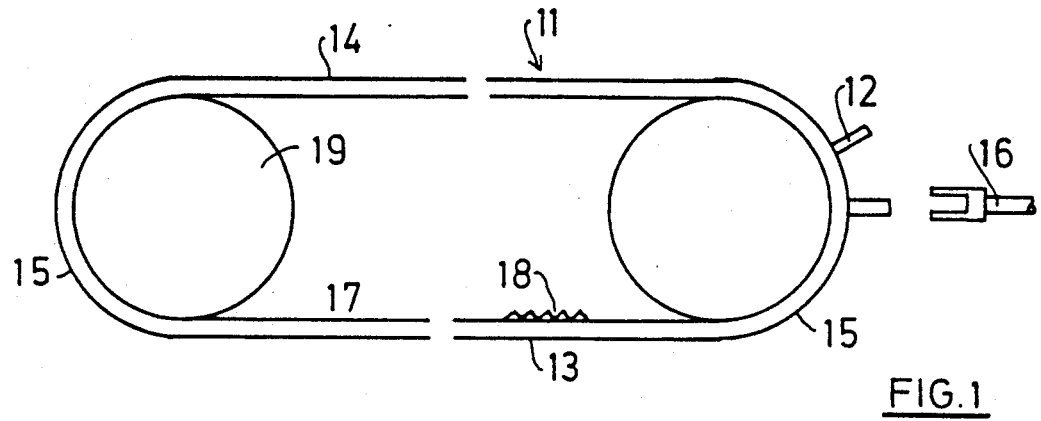
FIG. 1: Diagrammatically a plan view of an apparatus proposed by the invention.

FIG. 1 shows in highly diagrammatic manner how the apparatus is constructed. The movement path 11, along which the cassettes 12 to be stored are moved, is formed in the represented embodiment by two linear portions 13, 14 and two hemispherical arcs 15 having the same radius used for interconnecting said linear portions 13, 14, which are parallel to one another. The cassettes 12 are so held with respect to the movement path 11 that they point outwards, so that they can be removed from the outside. For inserting and removing the cassettes 12 an automatically operated gripper with tongs 16 is provided, whose two tong arms can engage on the cassettes 12 and remove same in this way. The gripper 16 is located in the vicinity of the front end of the movement path 11 and is preferably centrally located between the extension of the two linear portions 13, 14. As can be gathered from the diagrammatic view of FIG. 1 at this point the reciprocal spacing of the cassettes 12 is at a maximum, so that a favorable action of tongs 16 is possible.

In order that the cassettes can be moved along the movement path 11, a driving means is provided having a driving belt 17 guided parallel to the movement path 11. The driving belt is a toothed belt, whose tooth system 18 is arranged on the inside of the closed path. The driving belt 17 travels around two equally large toothed disks 19, which are provided on their outside with in each case a tooth system (not shown). The force transmission between the driving belt 17 and the cassettes 12 is not shown in FIG. 1, but will be apparent from a subsequent drawing.

Figure 2:
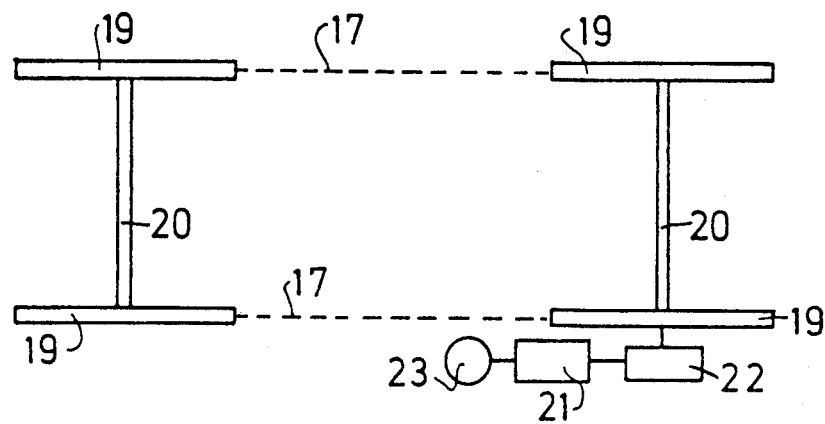
FIG. 2: Diagrammatically the side view of the arrangement shown in FIG. 1.

It can be gathered from the side view of FIG. 2 that both in the vicinity of the top and in the vicinity of the bottom of the apparatus a toothed disk 19 is provided. In each case one pair of superimposed toothed disks 19 is interconnected by a shaft 20. Such a shaft 20 is driven by an electric motor 21 by means of a gear 22. The driving motor 21 and/or the gear 22 are connected to an angle encoder 23, which carries two marking paths phase-displaced by 90°. Opposite to each of the two marking paths is provided a reader, so that an evaluating means can detect not only the distance covered as a result of driving motor 21, but also the direction in which the movement takes place. It is therefore possible with the aid of an evaluating means to establish the exact point of each mounting support for a cassette 12 at a specific time. Both the two upper toothed disks 19 and the two lower toothed disks 19 are interconnected by in each case one driving belt 17. As a result of the tooth system 18 of driving belt 17 a positive connection is obtained, so that in fact it is possible to establish the precise position of each mounting support. The toothed disks 19 on the not directly driven side need not be connected by a shaft 20.

It can readily be gathered from FIG. 1 that there is a particularly great space utilization, i.e. the space taken up by the cassettes relative to the total space needs of the installation, if the spacing of the linear portions 13, 14 is particularly small or, in other words, the diameter of the toothed disks 19 is particularly small. The smaller the diameter of the toothed disks or the spacing of the linear portions 13, 14, however, the higher the rotational speed in the two curved path portions 15 at a given speed of the mounting supports and cassettes rotating with rods 45.

Figure 3:
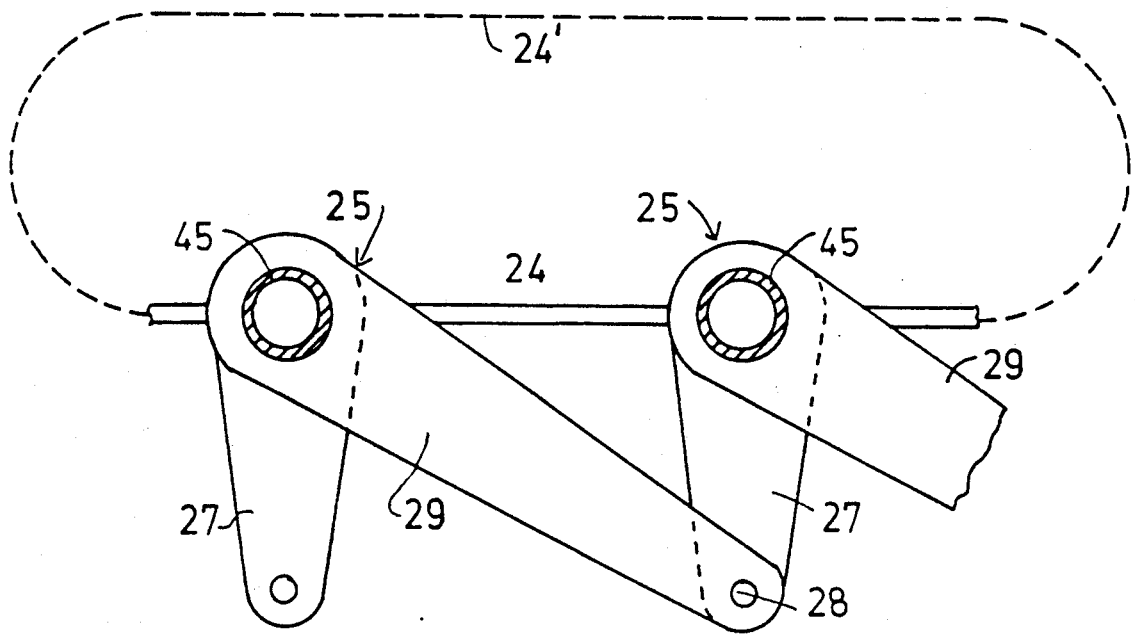
FIG. 3: Diagrammatically a possibility for a forcible control.

At the transition point from the straight portions 11, 14, 17, 18 to the curved path portions 15, the path curvature has a jump. If the rods were guided on the path in such a way that their rotation angle in plan view is identical with the rotation angle of the path tangent, then there would also have to be a sudden rotational speed change at the transition points, the height of the jump of the rotational speed being inversely proportional to the path diameter. The rotational speed jump theoretically leads to infinitely high forces and in practice to uncontrollable overstressing. However, in order to also keep the forces small with a small diameter of the movement path, the invention proposes a forcible control of the movement of the mounting supports for the cassettes, which leads to a reduction of the centrifugal forces. An example of such a forcible control is diagrammatically shown in FIG. 3. FIG. 3 shows a linear portion of a guideway 24, the further path of the latter being indicated by the broken line 24'. Movably arranged on the guideway are chassis 25 for the mounting supports for the cassettes 12, FIG. 3 showing two adjacent chassis 25. To each chassis 25 is rotatably connected a bar 45, the mounting supports for the cassettes 12 being connected in non-rotary manner to bars 45. For reasons of simplicity, FIG. 3 does not show the mounting supports, because this drawing only explains the principle of initiating the rotary movement. An outwardly directed steering lever 29 sloping with respect to guideway 24 is connected to each bar 45. A rotation of steering lever 29 leads to a rotation of bar 45. In the vicinity of the outer ends of the steering lever 29 a pin 28 is arranged thereon. This pin 28 could e.g. be guided in a rail, which would consequently bring about a forcible rotation of steering lever 29 and therefore bar 45. In the case of the forcible guide shown in the embodiment a push rod 27 is connected with the aid of pin 28 to each steering lever 29, said push rod being rotatably articulated to the adjacent chassis 25 or the bar 45 located there. If e.g. in the case of a movement to the right in FIG. 3, the right-hand chassis 25 comes into the vicinity of the curvature, then the push rod 27 pulls the steering lever 29 of the following chassis 25 and therefore rotates its bar 45 before the mounting support passes into the curved portion of guideway 24. The same takes place with movements in the reverse direction.

Figure 4:
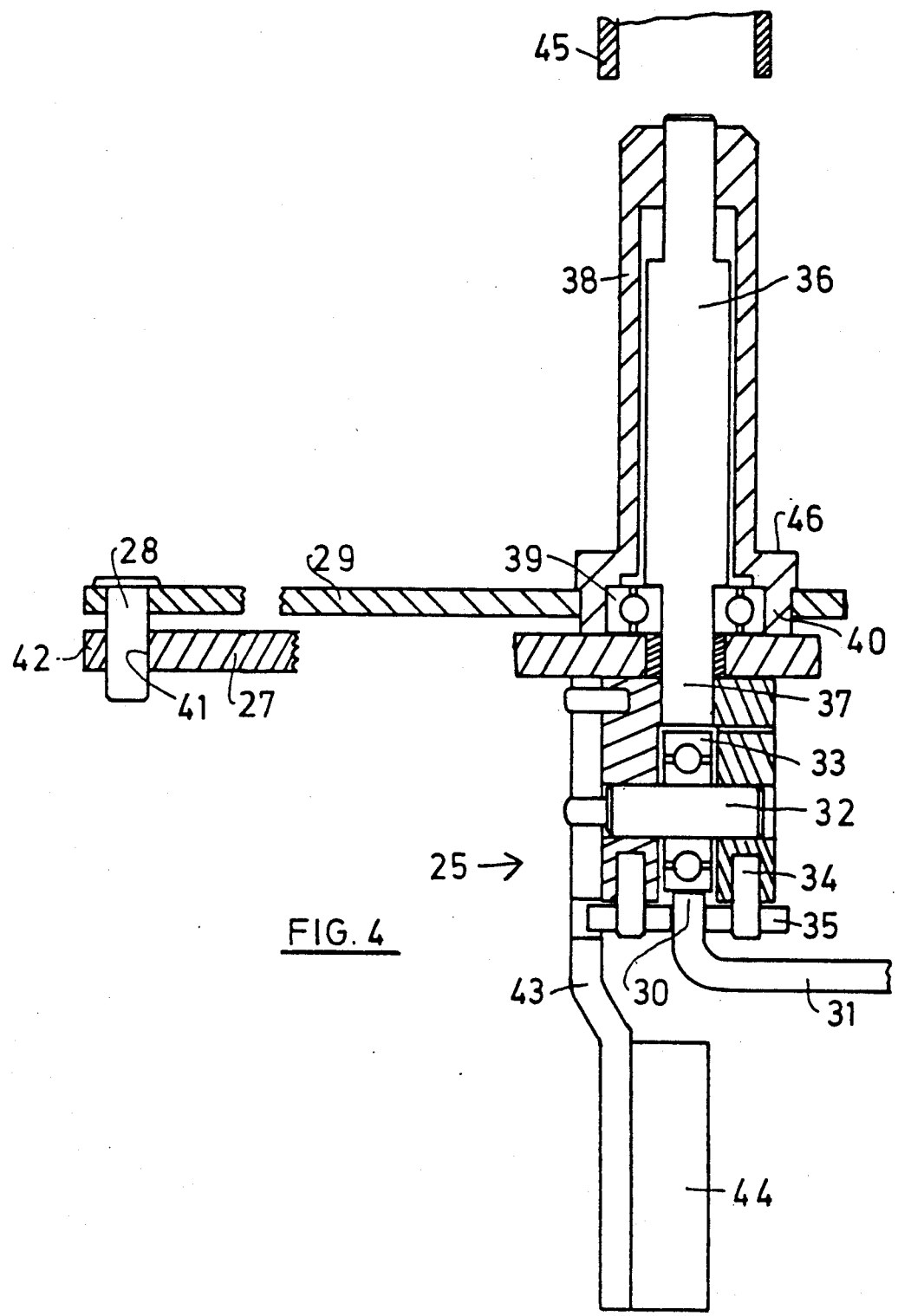
FIG. 4: A vertical section through a chassis.

FIG. 4 shows a possible construction for the forcible control in FIG. 3. The guideway is formed by an upwardly directed edge 30 of a trough 31 and on which is guided the chassis 25. In chassis 25 is arranged a runner 33 mounted about a horizontal shaft 32 and which runs on the upper edge 30 of trough 31. For lateral guidance purposes, there are in all three guide wheels 35 running about vertical shafts 34 and whereof only two can be seen in the sectional view of FIG. 4. The three guide wheels 35 are used for guiding the chassis, while the runner 33 carries the weight. A vertical pin 36 is fixed in chassis 25 and the push rod 27 is pivotably mounted about its lower portion 37.

A bush 38 is mounted on pin 36 and in its lower region is mounted with respect to the pin 36 by a ballbearing 39. In its upper region, the bush 38 is supported with its axial bore on the end of pin 36. Thus, the bush 38 is rotatable with respect to pin 36 and also with respect to the chassis 25.

The steering lever 29 is connected in non-rotary manner to the lower edge 40 of the rotary bush 38, e.g. by tight fitting. Therefore a movement of steering lever 29 leads to a rotation of bush 38. In the outer end of steering lever 29 is inserted pin 28, which passes through a hole 41 in the vicinity of the outer end 42 of push rod 27 of the adjacent chassis 25. Thus, the movement of the in each case adjacent chassis 25 leads to the movement represented in connection with FIG. 3.

Onto the outside of chassis 25 is screwed a driver 43 and on whose lower region 44 acts a driver arranged on the outside of driving belt 17 for moving the chassis 25. A diagrammatically indicated pipe 45 is mounted on bush 38 and engages on a shoulder 46 of said bush and is firmly connected pipe 45.

Figure 5:
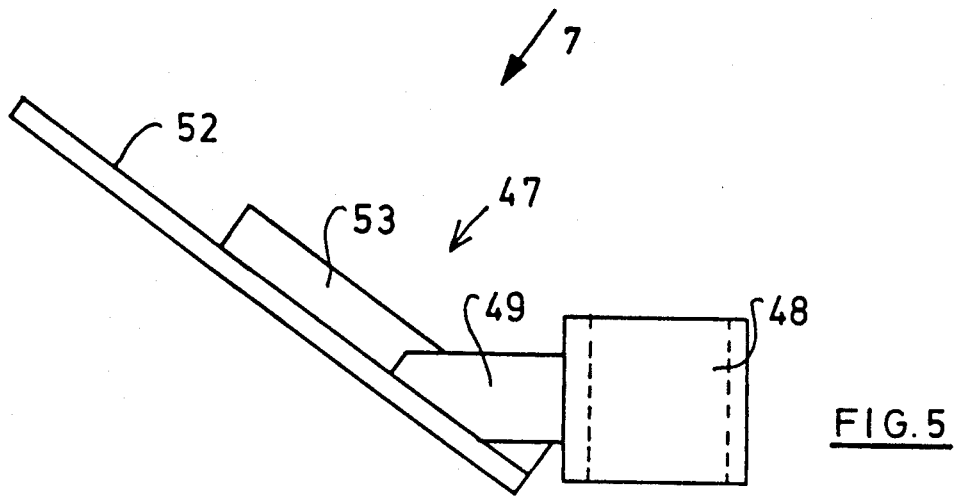
FIG. 5: A side view of a mounting support for receiving a cassette.
Figure 6:
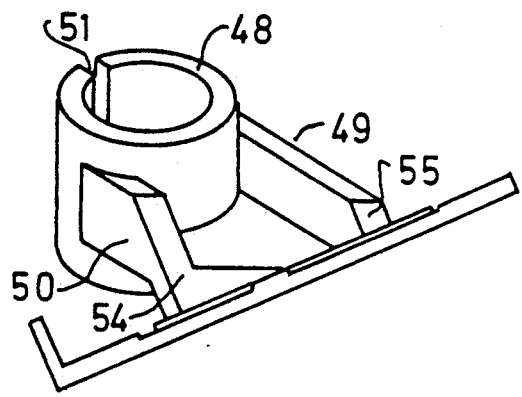
FIG. 6: A perspective view of the mounting support of FIG. 5.
Figure 7:
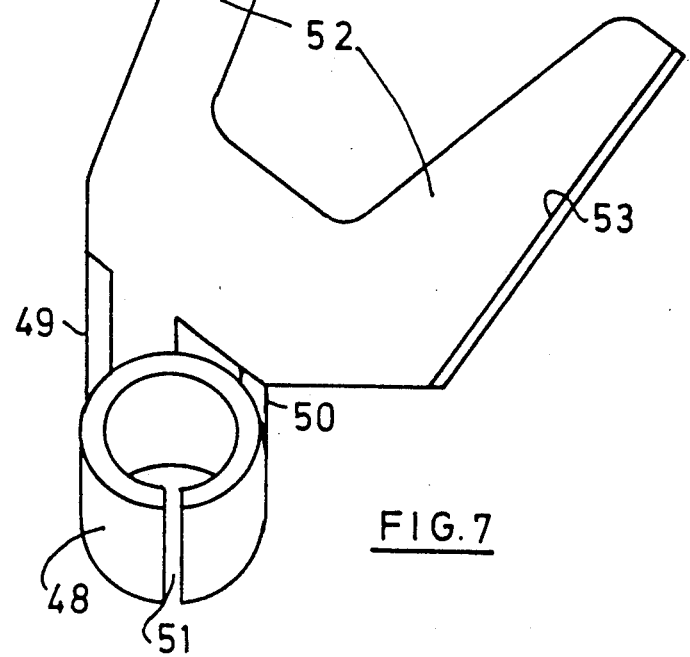
FIG. 7: A view of the mounting support in the direction of arrow VII in FIG. 5.

FIG. 5 is a side view of a mounting support 47 for the cassettes 12 to be stored in the apparatus. The mounting support contains a tubular portion 48, which is connected by two arms 49, 50 to the contact surfaces. The tubular portion 48 has an elongated slot 51, cf. FIGS. 6 and 7, which facilitates its mounting on pipe 45. The portion can be locked to pipe 45 e.g. with the aid of a pipe clip or clamp, or some similar device. The mounting support has a fork-like bearing surface 52 for one wide side of the cassette 12. As can be gathered from FIG. 5, said bearing surface 52 slopes with respect to the vertical formed by the longitudinal axis of the tubular portion 48. At right angles to said bearing surface 52 is provided a contact surface 53, which corresponds to a terminal edge of cassette 12, as can be gathered from FIG. 7 and which also slopes with respect to the vertical. The third surface against which the cassettes engage is formed by the top 54 of arm 50 and a shoulder 55 of arm 49 located in the same plane. This surface also slopes with respect to the vertical. A type of hopper or funnel is formed by the three surfaces 52, 53, 54 at right angles to one another and into it can slide a parallelepipedic cassette 12 and the latter is centered or aligned thereon.

The marked slope of the mounting supports in the inwards direction also has the consequence that the considerable centrifugal forces in the vicinity of the curved path (which are proportional to the square of the speed and inversely proportional to the diameter of the path) do not lead to the cassette slipping out of the mounting supports. Therefore the store can be moved at a higher speed than in the case of a horizontal or slightly inclined arrangement of the mounting supports.

Figure 8:
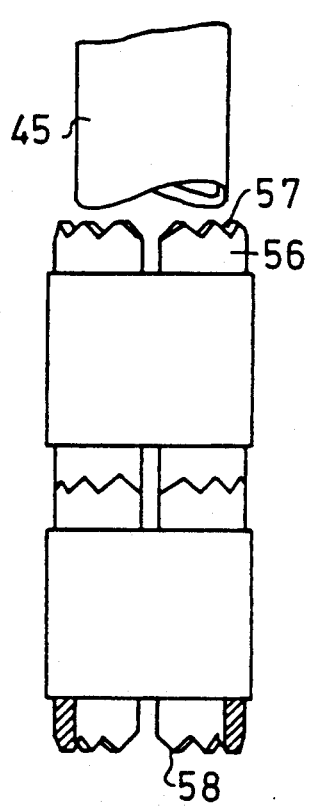
FIG. 8: Tubular portions of two superimposed mounting supports.
Figure 9:
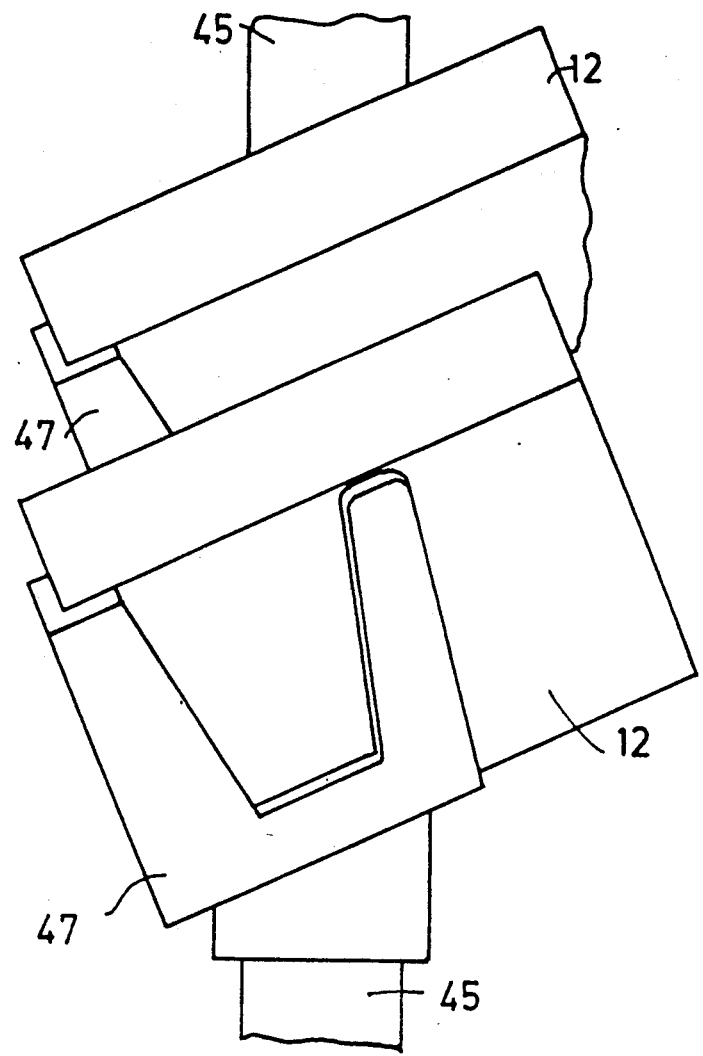
FIG. 9: A diagrammatic side view of two mounting supports with inserted cassettes.

FIG. 8 shows in part sectional form a front view of the tubular portions of two superimposed mounting supports in another embodiment. Top 57 and bottom 58 of each tubular portion 56 is toothed and complimentary to one another, so that the tubular portions can only be mounted on a pipe 45 in a specific coinciding orientation with respect to one another. In this case, a corresponding construction is provided on the chassis or the bush 38 connected thereto. This ensures a correct coinciding orientation of all the mounting supports on a pipe 45 and as is e.g. shown in FIG. 9. In the latter there are two mounting supports 47 with inserted cassettes 12 on a pipe 45. The wide sides of the mounting supports 12 have such a reciprocal spacing that the tongs 16 arranged on the front end of a gripper can grip cassettes 12. Gripping is also made possible by the fork-shaped construction of bearing surface 52, because the tongs can grip in the gap between the two prongs of the fork.

An apparatus for storing data carrier cassettes contains chassis with mounting supports, which are movable along a guideway constituted by two semicircles and two linear portions interconnecting these. Movement takes place in both directions. In order to permit a good space utilization and a high access speed, the mounting supports for the cassettes are forcibly guided in such a way that the initiation of the rotary movement for the mounting supports takes place in shock-free manner. In addition, the mounting supports are inclined so steeply with respect to the vertical, that the cassettes on the one hand are centred under their own weight on the three walls of the mounting support and on the other hand the slope driven force resulting from their own weight is so high that it preponderates over the opposing component of the centrifugal force and thus a slipping of the cassette out of the mounting support is prevented.

We claim:

1. Apparatus for storing piece goods, particularly data carrier cassettes, comprising:
   a guideway forming a closed movement path defined by circular arcs and linear portions connecting the circular arcs;
   a plurality of chassis movable in at least one direction along the guideway, at least one mounting support for holding a single piece good being attached on each of the plurality of chassis in a rotary manner about a vertical axis;
   a driving means for driving the plurality of chassis in a controlled manner for bringing a selected one of the chassis to a controlled manner for bringing a selected one of the chassis in a location where a piece good can be removed from or inserted into a corresponding selected mounting support; and,
   each of the chassis having a push rod and a steering lever associated therewith, the push rod for each chassis being non-rotatably fixed relative to the chassis and pivotally fixed to the steering lever of an adjacent chassis at a pivot point spaced laterally from said vertical axis, the mounting supports being coupled in non-rotary manner relative to the chassis and relative to the push rod, whereby the mounting supports are forcibly guided such that rotary movement of the mounting supports is initiated in shock-free manner in the vicinity of a transition between the linear portion and the curved portion of the movement path and is ended in shock-free manner in the vicinity of a transition between the curved portion and the linear portion of the movement path.

2. Apparatus according to claim 1, wherein the rotary movement starts before reaching the curved path portion and ends on leaving the curved path portion.

3. Apparatus according to claims 1 or 2, wherein the plurality of chassis are driven by a driving belt guided along at least one of the movement path and the guideway.

4. Apparatus according to claim 1, wherein the steering levers are directed towards an outside of the movement path and are positioned by adjacent ones of the plurality of chassis.

5. Apparatus according to claim 1, wherein the guideway is formed by a rail on which the plurality of chassis are guided by means of runners.

6. Apparatus according to claim 1, further comprising vertical rods rotatably fixed to the chassis, on each said rod being arranged several mounting supports.

7. Apparatus according to claim 1, wherein there are two superimposed guideways with chassis, the superimposed chassis are interconnected by rods and the drive is provided by in each case one upper and one lower driving belt.

8. Apparatus according to claim 6, wherein the vertical rods are constructed with one of a round and a polygonal cross-section.

9. Apparatus according to claims 1 or 2, wherein the mounting supports for the piece goods are constructed in funnel-like manner, so that the piece good under its own weight slides into a centered, stable position.

10. Apparatus according to claims 1 or 2, wherein a mounting support is provided for each said piece good.

11. Apparatus according to claims 1 or 2, wherein the mounting support is adapted for parallelepipedic piece goods, the mounting support having three contact surfaces which are perpendicular to one another and each inclined to vertical.

12. Apparatus according to claim 6, wherein the mounting supports have pipe portions, which are engageable on the rods.

13. Apparatus according to claim 12, wherein the pipe portions of the mounting supports have on at least one of their tops and bottoms aligning means operable to fix alignment of said mounting supports with respect to one of the adjacent mounting support and the chassis.

14. Apparatus according to claims 1 or 2, further comprising an automatic gripper arranged in the vicinity of a front end of the movement path for inserting and removing the piece good.

15. Apparatus according to claims 1 or 2, wherein a plurality of said mounting supports are juxtaposed at said location for removing the piece good, in such a way that front ends of the mounting supports used for removal are roughly arranged on a circular arc.

16. Apparatus according to claim 15, wherein the gripper is positioned to access a selected one of the piece goods along the circular arc.

17. Apparatus according to claim 11, wherein the slope of the contact surfaces, the movement speed of the mounting supports for the piece good and the forcible control of the rotary movement are matched to one another in such a way that the piece good remains in its mounting support.

18. Apparatus according to claims 1 or 2, comprising a plurality of vertically superimposed mounting supports, and wherein the vertically superimposed mounting supports are interconnected.

19. Apparatus according to claim 18, wherein the mounting supports are interconnected by engaging on a rod.

20. Apparatus according to claim 18, wherein several mounting supports are constructed in one piece.

21. Apparatus for storing piece goods, comprising:
   a guideway forming a closed movement path defined by circular arcs and linear portions connecting the circular arcs;
   a plurality of chassis movable in at least one direction along the guideway, at least one mounting support for holding a single piece good being attached on each of the plurality of chassis in a rotary manner about a vertical axis; and,
   a driving means for driving the plurality of chassis in a controlled manner for bringing a selected one of the chassis to a location where a piece good can be removed from or inserted into a corresponding selected mounting support, each said chassis being rotated by passage around said circular arcs, and wherein the mounting supports are rotationally guided by connections between successive leading and trailing ones of the chassis, said connections fixing relative movement of corresponding successive leading and trailing ones of the mounting supports, the connections including a push rod and a steering lever associated with each chassis, the push rod for each chassis being non-rotatably fixed relative to the chassis and pivotally fixed to the steering lever of an adjacent chassis at a pivot point spaced laterally from said vertical axis, the mounting supports being coupled in non-rotary manner relative to the chassis and relative to the push rod, whereby rotary movement of a trailing one of the mounting supports is initiated and stopped in shock-free manner in the vicinity of transitions between the linear portion and the curved portion of the movement path, each said connection causing the leading one of the mounting supports to start and stop rotation of the trailing one, in the vicinity of a transition between the curved portion and the linear portion of the movement path.

22. Apparatus according to claim 6, wherein the rods are pipes.

* * * * *

UNITED STATES PATENT AND TRADEMARK OFFICE
CERTIFICATE OF CORRECTION

PATENT NO. : 5,012,919

DATED : May 7, 1991

INVENTOR(S) : TRAPP et al.

It is certified that error appears in the above-identified patent and that said Letters Patent is hereby corrected as shown below:

Column 6, line 6, after "connected" insert --thereto. The mounting supports discussed hereinafter are connected to--.

Column 7, lines 21-22, after "chassis to" delete "a controlled manner for bringing a selected one of the chassis in".

Signed and Sealed this

Thirtieth Day of March, 1993

Attest:

STEPHEN G. KUNIN

Attesting Officer     Acting Commissioner of Patents and Trademarks